INVENTOR.
WILLIAM K. PRATT
BY Angus & Mon
ATTORNEYS.

INVENTOR.
WILLIAM K. PRATT
BY
ATTORNEYS.

United States Patent Office 3,269,031
Patented August 30, 1966

3,269,031
DEVICE FOR TEACHING COMPUTER
PROGRAMMING
William K. Pratt, Los Angeles, Calif., assignor, by direct
and mesne assignments, to Calair Diversified, Inc.,
Santa Monica, Calif., a corporation of California
Filed Feb. 4, 1964, Ser. No. 342,356
9 Claims. (Cl. 35—13)

This invention relates to teaching machinery, and in particular to a device for teaching the operation of computers.

In the teaching of computer operation it is, of course, necessary to teach the student how to program a computer. This requires a knowledge both of how a computer functions in its arithmetic processes, and also as to how to set up the computer so that it will accomplish these processes and provide an answer.

The teaching of the mere arithmetic processes is readily accomplished by textbook courses, and presents no particular difficulties to the student. However, as to an actual computer, the mechanism for performing the arithmetic operations represents a very considerable portion of the cost. The programming portion of the computer, however, represents to the student the portion with which he must most frequently deal in setting up the computer to perform its operations, and the most difficulty in comprehension. Heretofore, there has been no means for separating the programming portion of a computer from the arithmetic portion of it, because they have been completely interrelated. Then a program-teaching machine was not practical, because a whole computer had to be provided. Therefore, instruction of students in computer programming has constituted either a pure textbook operation, relatively incomprehensible to many students, or has involved the use of an actual computer with its attendant expense and lesser availability to a student in a class.

It is an object of this invention to provide a simple and inexpensive teaching machine which will simulate the programming portion of a computer under complete control of the student, and without relationship to the arithmetic computation portion of a computer, thereby making practical programming instruction available in an inexpensive device for the first time. In this invention, no attempt whatever is made mechanically or electronically to perform any computing operations. The student himself does the arithmetic. Furthermore, this device differs from standard computers in that the performance of the program is not accomplished automatically under computer control, but only under the commands of the student himself, so that he takes a part in each and every step of the program, both in storing the data upon which the computer operates and in causing the program to take place, thereby completely familiarizing the student with all aspects of computer programming and operation.

There are numerous schemes of computer operation particularly as to the number of addresses utilized. In this device a three-address system is utilized. Persons skilled in the art will have no difficulty extending this device to a four-address system, nor in using this device to carry out one- and two-address techniques.

A teaching device according to this invention includes a memory storage area in which the student is provided with a plurality of memory cells having specific locations defined by sector and channel numbers and locatable by memory indicia means. These cells contain orders, data and the like. In an actual computer, data and orders in these cells would control the operation of the arithmetic portion. Register indicia means is provided to indicate to the student the process relative to the memory storage cells which is presently in operation. Operation indicia means is provided to inform the student of the operation in effect on the material taken from or supplied to the memory storage cells.

An order register is provided with order register switches which gives instructions for a specific operation, combined with channel and sector selectors to guide the student to the pertinent cell. An operation switch is provided for switching among the order register switches, the register indicia means, and operation indicia means, as appropriate to a sequential program.

This invention will be fully understood from the following description and the accompanying drawings in which.

Figure 1:
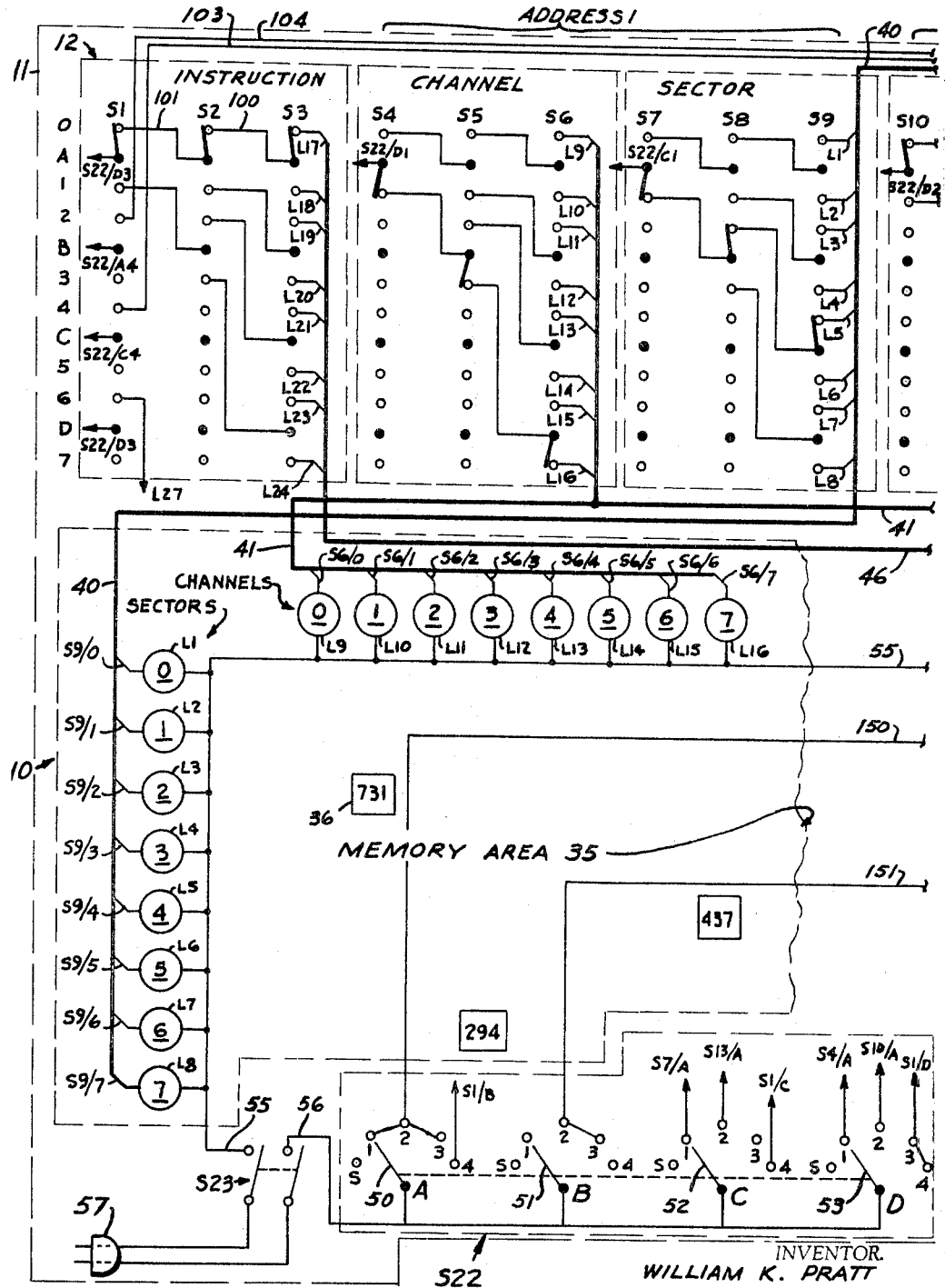
FIG. 1 is an electrical circuit diagram overlaid by indicator panel indicia, showing the presently preferred embodiment of the invention.

The teaching machine 10 of this invention includes a panel 11, the major elements of which are shown in FIG. 1. At the top, there is disposed an order register 12 comprising twenty-one (21) order register switches S1–S21, inclusive. These are arranged into groups of three, and together make up a rank of seven basic switches each capable of counting eight numbers so as to accommodate octal data.

Figure 2:
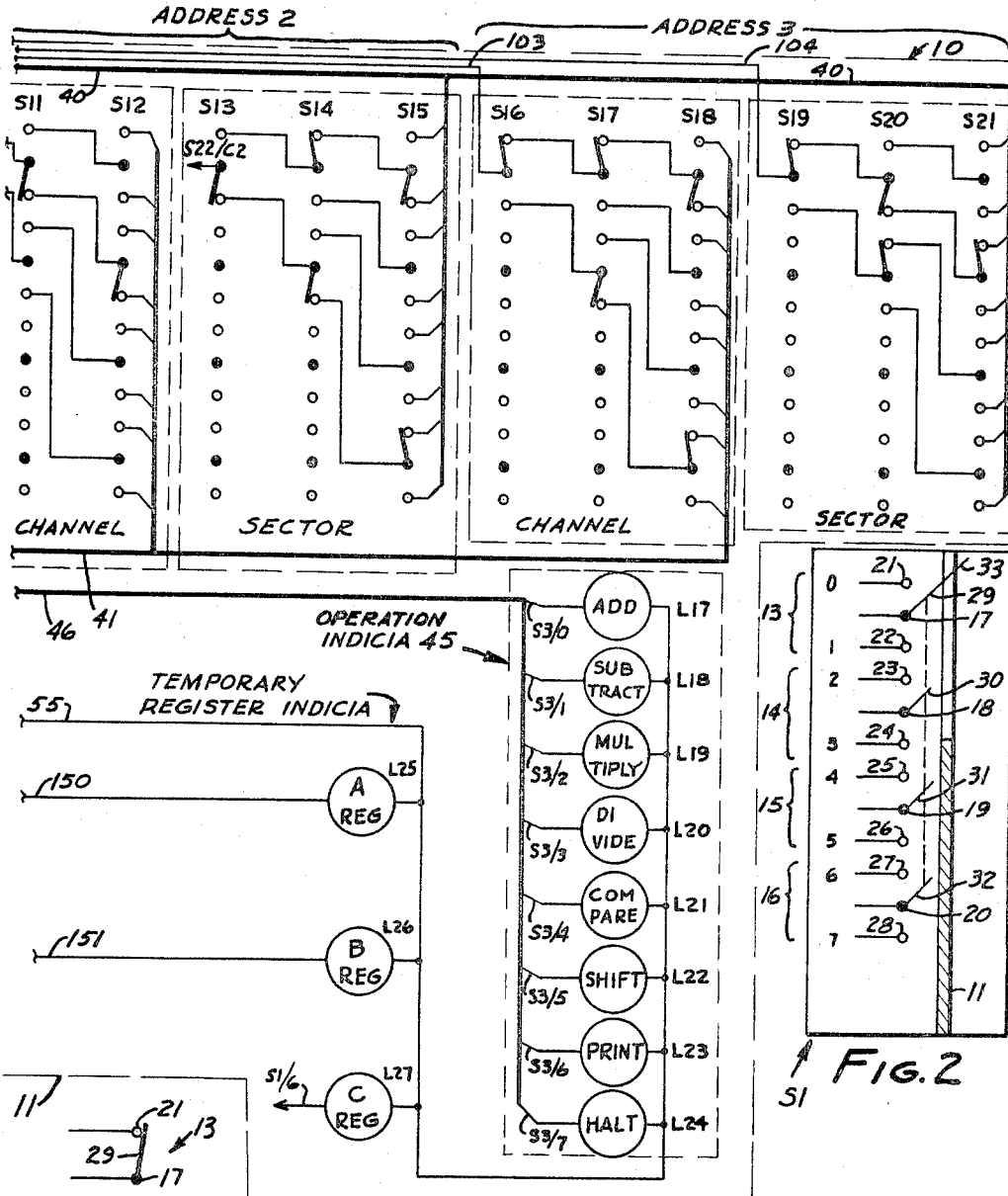
FIGS. 2, 3 and 4 show operating features of certain schematically-shown switches in FIG. 1.
Figure 3:
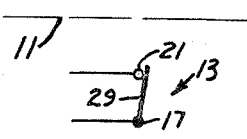
Figure 4:
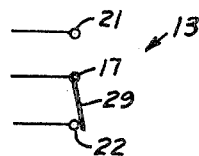

As is best illustrated in FIGS. 2–4, each of these switches comprises four individual binary switch elements 13, 14, 15, 16. Each is provided with a central switch terminal 17, 18, 19, 20, and with respective pairs of switching terminals 21, 22; 23, 24; 25, 26; and 27, 28. Contactors 29, 30, 31, 32 respectively switch between the respective central switch terminals to one or the other members of the individual pairs of switch terminals. The contactors are ganged as illustrated in FIG. 2, and one of them includes a handle 33 which protrudes through the panel. All switches controlled by an individual handle have the same setting. FIGS. 2–4 illustrate switch S1.

The switches have eight levels as illustrated by the Arabic numerals to the left of FIGS. 1 and 2, which correspond to the respective arithmetic levels. These levels are 0–7, inclusive. FIGS. 3 and 4 illustrate two conditions of element 13. In FIG. 3, contactor 29 interconnects terminals 17 and 21. In FIG. 4, contactor 29 interconnects terminals 17 and 22. In the notation used herein, FIG. 3 indicates a 0 count, and FIG. 4 indicates a 1 count in the binary system of notation, thereby providing for a single bit of information.

Switches S1–S3 are interconnected as shown to provide for instruction selection. Switches S4–S6 are interconnected together to provide for channel selection in address 1, while switches S7–S9 are interconnected together for sector selection in address 1. Similarly, switches S10–S12 are interconnected to provide for channel selection in address 2, while switches S13–S15 are interconnected to provide for sector selection in address 2. Switches S16–S18 are interconnected to provide for channel selection in address 3, while switches S19–S21 are interconnected to provide for sector selection in address 3.

A memory area 35 is provided on the surface of the panel upon which a student can put a sheet of paper divided into a grid of sixty-four (64) memory cells, each cell representing a region for storage of orders, data or the like. Such a grid, which is not shown in detail because it would serve only to complicate the drawings, is defined by sectors for the ordinate, and channels for the abscissa. These sectors and channels are respectively indicated by lamps L1–L8, and lamps L9–L16, respectively. For convenience in readout, the arithmetic coordinates are shown on the lamps as 0–7, inclusive. Thus, area 36 represents information stored at channel 3, sector 6. Memory lights L1–L8 are connected to a harness 40, which will be described in fuller detail later, this harness being interconnected to sector switches in addresses 1, 2 and 3. Similarly, memory lights L9–L16 are connected by harness 41 to channel switches in addresses 1, 2 and 3.

The panel also includes an operation unit 45 comprising eight operation lights or indicia, L17–L24, respectively. The operations indicated by these lights are shown on the panel and are as follows:

| L17 | Add | L21 | Compare |
|-----|-----|-----|---------|
| L18 | Subtract | L22 | Shift |
| L19 | Multiply | L23 | Print |
| L20 | Divide | L24 | Halt |

The operation lights are connected by means of harness 46 to the instruction switch in the order register.

Temporary register indicia is provided to indicate the programmed occurrence of a specific operation relative to data in the memory storage area. This indicia comprises lamps, L25–L27. These lamps are indicated as "A" register, "B" register and "C" register, respectively. An operation switch S22 is provided which accomplishes the sequential operation of this device. This is conveniently a rotational switch having four contactors 50, 51, 52 and 53 in switch segments A, B, C and D. Each of these segments includes switching contacts identified as S1, 2, 3 and 4, thereby providing five circuit settings for each of the segments of the operation switch.

A power switch S23 comprises a double-pole, single-throw switch adapted to make a connection between leads 55 and 56 which are adapted to make connection through a plug 57 to any desired source of power, 117 volt A.C., for example.

The respective interconnections between terminals in the operation switch and of terminals in the order register switches are indicated by standard notations of coordinate and contact references, instead of by continuous lines which later would only complicate the drawings. This scheme of notation is well known in the art.

Harnesses 40, 41 and 46 are schematically illustrated so as to reduce the complication of the drawings. As a single illustration, two portions of harness 40 are shown in full detail in FIG. 5. Suffice it to say that the eight lights L1–L8 are each individually connected by individual wires in the harness to individual terminals of switches S9, S15 and S21. Similarly, respective lights L9–L16 are connected by individual wires in harness 41 to terminals of switches S6, S12 and S18. Similarly, operation lights L17–L24 are connected by individual wires in harness 46 to respective terminals of switch S3.

In FIG. 1, the connections between these lights and any register switch are shown by notation. For example, terminal S3/0 is shown as connected to L17 by this notation placed immediately adjacent to the terminal, and the reverse is shown by the indication adjacent to L17 that it is connected to S3/0.

Figure 5:
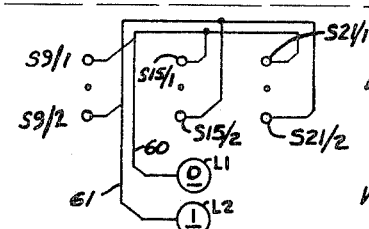
FIG. 5 indicates the physical meaning of a schematic notation utilized in FIG. 1.

In order to simplify the diagram, the notation explained in FIG. 5 has been utilized, only a portion of harness 40 being shown, which is ample for illustrative purposes. As can be seen, lamp L1 is connected by lead 60 to S9/1 as well as to S15/1 and S21/1. Similarly, lead 61 which also forms a portion of harness 40, connects lamp L2 to S9/2, S15/2 and S21/2. A similar lead, and an analogous connection is provided for each of the remaining lamps, the harness notation illustrating that this is a bundle of wires for analogous connections. For example, S9 shows lamps L1–L8 connected to its levels 0–7, respectively. Precisely the same is true of switches S15 and S21. Similarly, as to harness 41 lamps L9–L16 are shown as sequentially connected to levels 0–7 of switch S6 as well as to analogous levels of switches S12 and S18.

The interconnections within the groups of the switches in the order register switches are standard binary connections which do not require further description here.

An illustrative example of the operation of this device will now be provided. In this example, the process of addition will be carried out. However, the process of addition is illustrative only, the operation of the machine to carry out subtraction, multiplication and division being accomplished in an analogous manner. Assume for a moment that the student wishes to add the decimal number 294 to the decimal number 437. For this, the order of the operation will be provided in the memory storage area as well as the numbers and the answer. These areas are selected arbitrarily, but so as not to interfere with succeeding operations in the problem. Assuming the ordinate and abscissa to be written such that the first number is that of the channel and the second of the sector, the arbitrary arrangement may well be as follows:

| Order | Cell 32 |
|-------|---------|
| 437 | Cell 74 |
| 294 | Cell 36 |
| Answer | Cell 12 |

For this problem, the order to add the decimal numbers will be as follows: 0–74–36–12. The first number is 0, which means the operation is to add. The next number in the order is the location in the memory area of the first of the numbers to be added, and the second number in the order is the location of the second number to be added. The third number is the location of the cell in which the answer is to be placed.

This arrangement is shown in FIG. 1 by the entry (in pencil) of the command at cell 32, of the number 437 in cell 74, of the number 294 in cell 36, and of the answer (731) in cell 12. The student carries out the operation as follows. Knowing that the order is in cell 32, he refers to this cell for it, and now sets that order up on the order register. The first number being 0, all of the switches S1–S3 will be in the 0 position (as illustrated in FIG. 3). The next number being 7, all of switches S4–S6 will be in the 1 position (as illustrated in FIG. 4). The rank of switches S4–S6 in the binary system is conventional, the left-hand switch in this and in each group of three representing $2^2$, the next $2^1$, and the next $2^0$. The next number being 4, sector switch S7 will be set at the 1 position, and switches S8 and S9 will be in the 0 position. The next number being 3, switch S10 will be in the 0 position, and switches S11 and S12 in the 1 position. The next number being 6, the switches S13 and S14 will be in the 1 position, and switch S15 in the 0 position. The next number being 1, switches S16 and S17 will be in the 0 position, and switch S18 in the 1 position. The last number being 2, switches S19 and S21 are in the 0 position, and switch S20 will be in the 1 position.

Thus, the order is set up on the order register and the operation switch is turned to S with the power switch on, and the program is ready to begin. First, the student moves the operation switch to its position 1. The result of this is to light lamps L5 and L16, indicating area 74 which is the location at which the first data was recorded, namely numeral 437. At the same time, lamp L25 for the "A" register is illuminated, indicating that the number is to be transferred to the "A" register for arithmetic operations. The student at this time will write down the number 437 as though he were the computer.

Next, the operation switch is turned to setting 2, and lamps L12 and L7 are illuminated, indicating reference to memory cell 36, which contains numeral 294. At the same time, lamp L26 for "B" register is illuminated, indicating that data is to be taken out of this cell and transferred to the "B" register for arithmetic operations. The "A" register lamp stays on. The illumination of lamps L25 and L26 indicates that data is being stored from two cells awaiting some kind of operation.

The next operation involves the turning of the control to the switch position 3, at which time there are no channel and sector lights on, but all of the register lights, L25–L27, are on, and, in addition, operation light L17 for add. This indicates that the data from the "A" and "B" registers should be added and the result transferred to the "C" register, awaiting transfer into the memory storage. After the student performs the arithmetic of the operation (substituting for the computer), he then turns the operation switch to the fourth setting at which time lamps L3 and L10 light up. Lamp L27 ("C" register) remains on, while lamps L25 and L26 ("A" and "B" registers) have been extinguished, indicating to the student that he should take the information on the "C" register and store it in memory cell 12, this information being the number 731.

Should the above sequences have been subtraction, multiplication or division, the same sequences could have been undertaken, but the initial order would have been different because the setting of switches S1, S2 and S3 would have been different, to indicate subtract. This would have been pertinent only on the setting 3 of the operation switch, which is effective on the operation lights, indicating to the student that he should subtract, rather than add.

A brief resume of the switch connections that accompanied the above example will now be given. With the switch in its S position, there are no complete connections through the operation switch. With the operation switch S22 in its 1 position, and the order register switches set as above-described, starting with lead 56 and going through S22 sector A, a circuit may be traced through lamp L25, to lead 55, lighting lamp L25, the "A" register.

Also, a circuit may be traced from lead 55 through lamp L16, and thence through harness 41 to terminal S6/7, thence, because of the settings of the switches, to terminal S4/A. The connection from here is to S22/D1 where the circuit is returned to lead 56, thereby illuminating lamp L7.

Similarly, a connection can be traced through lamp L5 and harness 40 to S9/4, and thence through switches S7–S9 to terminal S7/A, which connects to S22/C1. The connection is thereby completed back to lead 56 so that these two lights are lighted. This causes lamp L5 to light.

The register switches in addresses 2 and 3 do not illuminate memory lamps, because in the first setting, they are connected to switch contacts number 2 in switch S22. When switch 22 moves to setting 2, memory lights are lighted respective to the second address because of the connections through S10 and S13. The connections are deducible, the same as the foregoing, except it will be noted that the circuit terminal connections of switches S4 and S7, being connected to the first position in switch S22, are not operative as to the channel and sector information in address 1.

As to address 3 (switches S16–S21), it will be noted that they connect to switch S22 through leads 103, 104 and switch S1, which is effective only at the A4 and C4 levels of switch S22. In this position, "C" register lamp L27 illuminates only when S1/D is in the zero condition, corresponding to one of the arithmetic operations. It does not illuminate for compare, shift, print or halt in position 4 of switch S22.

This device also provides the student with four additional types of commands, namely compare, shift, print and halt. These are selectively interconnected to the instruction switch so as selectively to be illuminated or extinguished, and also through the operation switch so as to be illuminated at an appropriate part of the cycle. For example, if the size of numbers were to be compared and then reference made to a next order or alternate order, then the order numbers to be compared in the next and alternate orders are placed into the memory area as aforesaid, and the problem set up with the instruction switch set at numeral 4 to call for comparison. The comparison operation occurs at step 3, at which time lamps L25 and L26 are lighted to indicate numbers on the "A" and "B" registers to be compared, and lamp L21 is illuminated to show that they should be compared. Circuits through these lamps may readily be traced.

With the numeral 5 set into the instruction switch, the command to shift goes on in the third position of the operation switch S22 as in the comparison situation. The same is true of print, wherein the instruction switch is coded 6. Similarly, when the instruction switch is coded 7, the halt light is illuminated on the third position.

Inasmuch as this device so completely simulates the operation of a computer, it is believed unnecessary to go into further detail as to types of operations, because the construction of this device and its use should be thoroughly understood from the foregoing. However, the use of this device has been more fully explained in the publication entitled "Computer Fundamentals and Programming" by Jeffrey L. Morby and William K. Pratt, Copyright 1963 by the aforesaid. The book is printed and available at Athena Scientific Company, 2216 Hill Street, Santa Monica, California, in which the use of this device is more fully set forth.

Suffice it to say at this point, that this teaching machine gives the student a complete control over ordering and programming the operation of a three-address computer, which device may be modified by persons skilled in the art to cover more or fewer address systems. It teaches the student the use of binary and octal notations, and enables him to take part in every step of a computer operation. For example, various loops and other types of programs may readily be accomplished on this device in accordance with known techniques, these techniques forming no part of the invention and calling for no further illustration here.

This invention is simple and straightforward for the purposes intended and gives the student an immediate feel of the subject matter inasmuch as he is now able to accomplish the operation of a computer, saving only that he himself fills in the data in the memory cells manually and also performs the operations himself. This does, however, save by far the greater proportion of the cost of a computer and makes available for the first time a teaching machine which is able to teach that portion of the operation of a computer which actually is accomplished by the operator.

This invention is not to be limited by the embodiment shown in the drawings and described in the description which is given by way of illustration and not of limitation, but only in accordance with the scope of the appended claims.

I claim:

1. A machine for teaching computer programming comprising: an area for simulating memory cells locatable by channel and sector coordinates; memory indicia means adapted to indicate selected channels and sectors; register indicia means adapted to indicate an operation of transfer of data from a cell; operation indicia means adapted to indicate the performance of a specified operation; an order register adapted to receive instructions relating to an operation to be performed and to data storage; and an operation switch adapted to activate memory indicia and register indicia means respective to a selected memory cell and step in a selected program, and thereafter an operation indicia means to indicate the class of operation to be conducted with the data respective to the register indicia means, and thereafter, when appropriate, the disposition in the area of data resulting from the operation, said operation switch being functionally unrelated to the actual performance or completion of any calculation or manipulatory step, said calculation or manipulatory steps being accomplished by the student in compliance with program steps indicated by actuation of said means as a consequence of sequential settings of the operation switch.

2. A machine according to claim 1 in which the order register comprises instruction switch means coded to receive operation-identity instructions, and a channel switch means and a sector switch means coded to receive the coordinates of a memory cell respective to the order to be accomplished.

3. A machine according to claim 2 in which the instruction switch means and the channel and sector switch means are binary coded so as to provide respective settings at number levels greater than two.

4. A machine according to claim 2 in which the instruction, channel and selector switches are binary coded, and respectively so interconnected as to provide octal notation.

5. A machine according to claim 2 in which the operation switch is serially connected to all indicia means, whereby to schedule the activation of the respective indicia means as a function of progress of the program, said progress being derived from sequential settings of the operation switch.

6. A machine for teaching computer programming comprising: an area for simulating memory cells locatable by channel and sector coordinates; memory indicia means adapted to indicate selected channels and sectors; a plurality of register indicia means adapted to indicate respective operations of transfer of data from a cell; operation indicia means adapted to indicate the performance of a specified operation; an order register for receiving operation and cell addresses, said order register comprising a binary coded switch having a plurality of settings, each setting being respective to an individual indicia means and a plurality of coded address switches, each address switch comprising a binary coded switch for channels and another for sectors, each having a plurality of settings, each setting being respective to an individual channel or sector memory indicia means, whereby the coordinates of a selected memory cell may be set in coded notation in said address switch; and an operation switch adapted to activate memory indicia means and register indicia means respective to a selected memory cell and step in a selected program, and thereafter an operation indicia means to indicate the class of operation to be conducted with the data respective to the register indicia means, and thereafter, when appropriate, the disposition in the area of data resulting from the operation, said operation switch being functionally unrelated to the actual performance or completion of any calculation or manipulatory step, said calculation or manipulatory steps being accomplished by the student in compliance with program steps indicated by actuation of said means as a consequence of sequential settings of the operation switch.

7. A machine according to claim 6 in which the instruction, channel and selector switches are binary coded, and respectively so interconnected as to provide octal notation.

8. A machine according to claim 6 in which the operation switch is serially connected to all indicia means, whereby to schedule the activation of the respective indicia means as a function of progress of the program, said progress being derived from sequential settings of the operation switch.

9. A machine according to claim 8 in which the instruction, sector and channel switches each comprises three binary coded switches so disposed and arranged as to provide a count of eight, each count of the instruction switch being respective to an individual operation, and each count of the sector and channel switches being respective to an individual ordinate or abscissa of the said area.

References Cited by the Examiner
UNITED STATES PATENTS

| | | | |
|---|---|---|---|
| 3,146,533 | 9/1964 | Carmody et al. | 35—13 |
| 3,162,960 | 12/1964 | Elmlinger | 35—30 |

EUGENE R. CAPOZIO, *Primary Examiner.*

WILLIAM GRIEB, *Assistant Examiner.*